July 28, 1959

A. J. McNABB 2,896,445

TUBULAR PIPE TESTING MACHINE

Filed Aug. 23, 1956

INVENTOR:
ARTHUR J. McNABB
BY Howson & Howson
ATTYS.

July 28, 1959  A. J. McNABB  2,896,445
TUBULAR PIPE TESTING MACHINE
Filed Aug. 23, 1956  5 Sheets-Sheet 3

FIG.4.

INVENTOR:
ARTHUR J. McNABB
BY Howson & Howson
ATTYS.

United States Patent Office 2,896,445
Patented July 28, 1959

2,896,445

TUBULAR PIPE TESTING MACHINE

Arthur J. McNabb, Phoenixville, Pa., assignor to Phoenix Steel Corporation, Phoenixville, Pa., a corporation of Pennsylvania Application August 23, 1956, Serial No. 605,842

15 Claims. (Cl. 73—49.6)

This invention relates to machines for testing the wall strength of hollow tubular pipe or tubing and in particular to means on the machine for making and maintaining fluid tight seals between the pipe under test and the machine. This invention also relates to novel sealing means for use in the heads of tubular pipe testing machines.

Many types of tubular pipe testers involve the use of a pair of opposed heads on an extended machine base which also provides supports where necessary intermediate the heads for the tubular pipe. In most machines of this type, fluid under pressure is introduced into the pipe from one of the heads. The introduction of fluid causes the pipe to radially expand and consequently to axially shorten. Although the amount of radial expansion is minute, the cumulative effect on the axial length of the pipe is often sufficient to cause a break in the seal between the pipe and the machine at one or both ends of the pipe, resulting in an escape of fluid. Consequently, testing on such machines at best has been a difficult and tedious process and in order to prevent the destruction of the seals, the pressures employed have been relatively low.

In accordance with the present invention, the fast, effective testing of tubular pipe sections is made possible by the device of the present invention. The sealing means in the heads of the machine of the invention make exceptionally good sealing contact with the ends of the pipes so that these seals will not fail even under extremely high testing pressure heretofore practically impossible to attain. Moreover, even severe axial shortening of a length of tubular pipe is not effective to break a seal in the machine of the present invention because at least one head of the machine is provided with sealing means which automatically follows up axial shrinkage of the pipe length and preserves the seal. Consequently, it is possible to test lengths of pipe relatively rapidly at pressures heretofore beyond normal testing ranges and to do so at a relatively small cost. Since pipe of large diameter is expensive to fabricate and expensive to install, it is of considerable importance to be able to locate any defects which would cause the pipe to fail and necessitate its untimely replacement, not to consider the possible interruption of important facilities which might result from such failure.

The device of the present invention, like tubular pipe testers heretofore, involves a pair of laterally spaced heads on a base. Axially aligned sealing means are provided on these heads and seal the ends of the pipe by axial pressure of the respective sealing means on the opposite ends of the pipe. Fluid supply means is provided for introducing fluid into the interior of the pipe length and for supplying sufficient pressure to the fluid to produce the desired test of wall strength. The sealing means within the heads seals the ends of the pipe length to each of the respective heads and prevents loss of fluid. This fluid tight seal is preserved because follow-up means urges the sealing portion of one of the heads against the end of the pipe so that it follows any axial shortening of the pipe.

Also novel in accordance with the present invention is the particular construction of the sealing receptacle for receiving the end of pipe to be tested. The sealing receptacle is much simpler than those heretofore employed and effectively self-sealing. Moreover, the sealing rings are sufficiently secure in position that upon withdrawal of the end of a length of pipe from the machine, the ring will not be lost, a problem which has been common in sealing devices using this type of sealing ring. In addition, the sealing receptacle is easily replaced to the extent necessary to test pipe of another diameter or end configuration so that little time is lost in setting up the machine for testing pipes of different diameters.

Specifically, the opposed sealing receptacles hold the ends of a length of pipe in fluid tight engagement by the use of an O-ring. The O-ring is engaged in an annular groove on the pipe end closure of the sealing means in such a way that it protrudes beyond the groove. Thus, the protruding portion is arranged to be partially compressed by the end of a length of pipe which is supported by and compressed axially against the ring by the opposed sealing means. Support means are also provided and adapted to circumferentially engage and mechanically support the outer sidewalls at the end of the pipe.

Fig. 1a is a plan view of one end of the machine from above showing auxiliary equipment used with the machine;

Fig. 2 is a side elevational view of the head at the end of the machine shown in Fig. 1a;

Referring first to Figs. 1–4, the overall structure of a machine embodying the present invention and associated structure which aids in the efficient handling of heavy pipe lengths will be described. In this connection, it should be observed that Figs. 1a and 1b may be placed side-by-side in order to facilitate visualization of the complete operation of the machine. Generally speaking, the machine consists of a pair of spaced heads 10 and 11, each of which has a frame or support structure 10a and 11a and a sealing structure 10b and 11b, respectively. Between the sealing structures 10b and 11b extends a length of pipe 12 to be tested. The pipe illustrated might have, for example, a length of fifty feet and cross-sectional diameter of 12 inches, although as will be seen, the features of the machine make it quite flexible and relatively easily adjustable to test sections of pipe of different lengths and different diameters.

Figure 4:
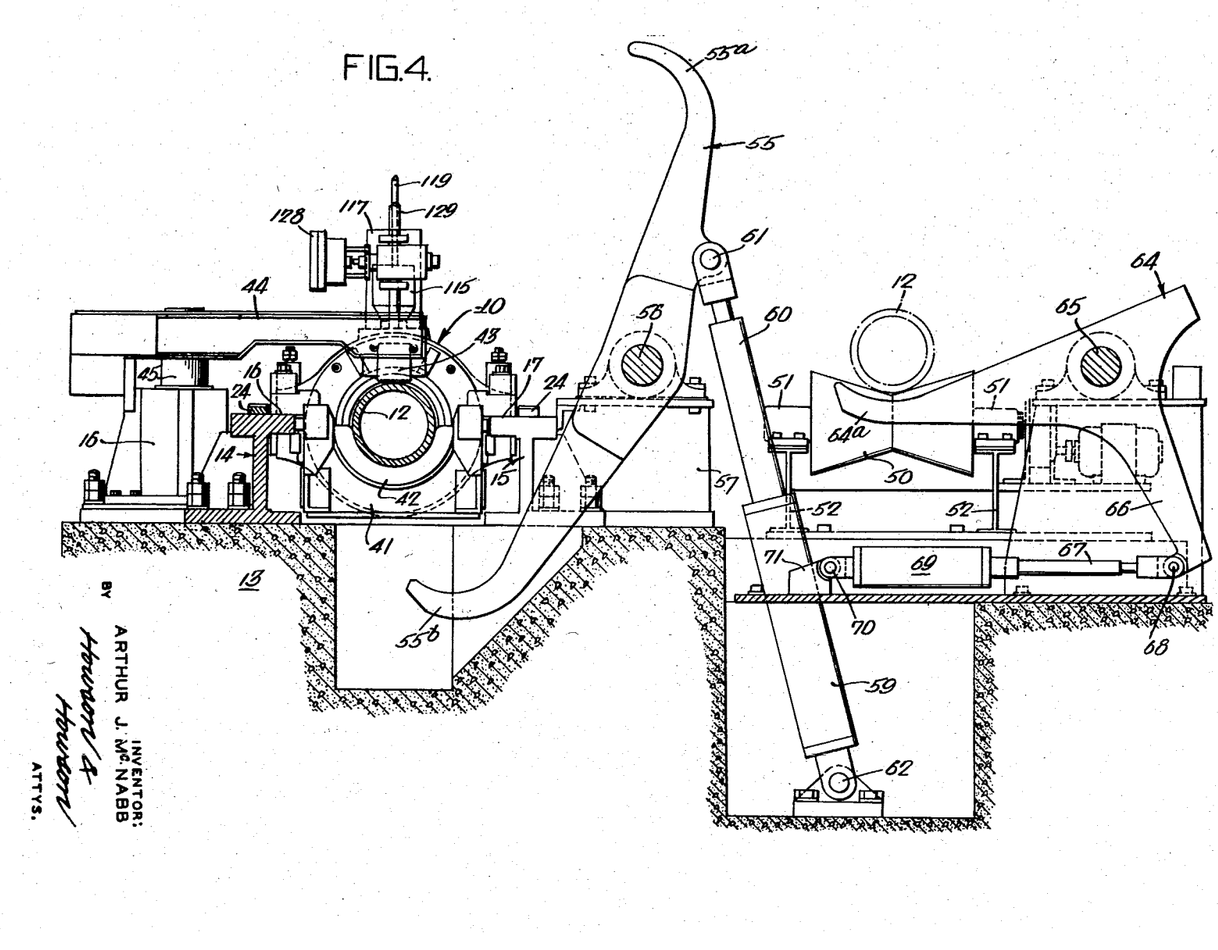
Fig. 4 is a view taken along line 4—4 of Fig. 1 showing details of the mechanism for placing the tubular pipe on the machine for testing.

Referring to Fig. 4, it will be seen that the machine as a whole is preferably based on a concrete footing or foundation 13. Bolted to this foundation in parallel alignment extending between the head structures 10 and 11 are beams 14 and 15 which provide track flanges 16 and 17, as shown. As seen particularly well in Figs. 4 and 2, there are flanges 18 on both sides of the head frame 10a which overlie the tracks 16 and 17. Each of these flanges is supplied with rollers or casters 18a of special construction to support the load of the head structure and to facilitate movement along the said track. Holes 20 extend through the tracks 16 and 17 at positions opposite one another at even intervals along the track, as may be best seen in Figs. 1a and 1b. The head frame structure 10a is provided with pins 21 which extend through holes in flange 18 which correspond in spacing to the holes 20 in the tracks 16 and 17. These pins are manually placed through aligned holes in flanges 18 and tracks 16 and 17. Four such pins are usually sufficient to hold the machine in place.

Similarly, frame 11a is provided with pins 22 which are movable by air cylinders 23 and which pass through holes 20 in the head structure 11 in place relative to the track. The air cylinders can be actuated in any desired manner and the pins extend through flanges 18' which are supported by casters 18a' in a manner similar to the support by casters 18a of the head structure 10.

Supported atop the tracks 16 and 17 are a pair of parallel toothed rack members 24. These rack members extend from that end of the machine on which structure 11 is supported to a position beyond the middle of the machine, the length of the rack portion being dependent upon the variation in the length of pipe which the machine is intended to test. Meshing with the racks are a pair of pinions 25 on opposite sides of the head 11, which pinions are connected together by a suitable shaft and driven by a motor 26 through a chain drive 27 and a suitable gear system 28.

Figures 1A, 2:
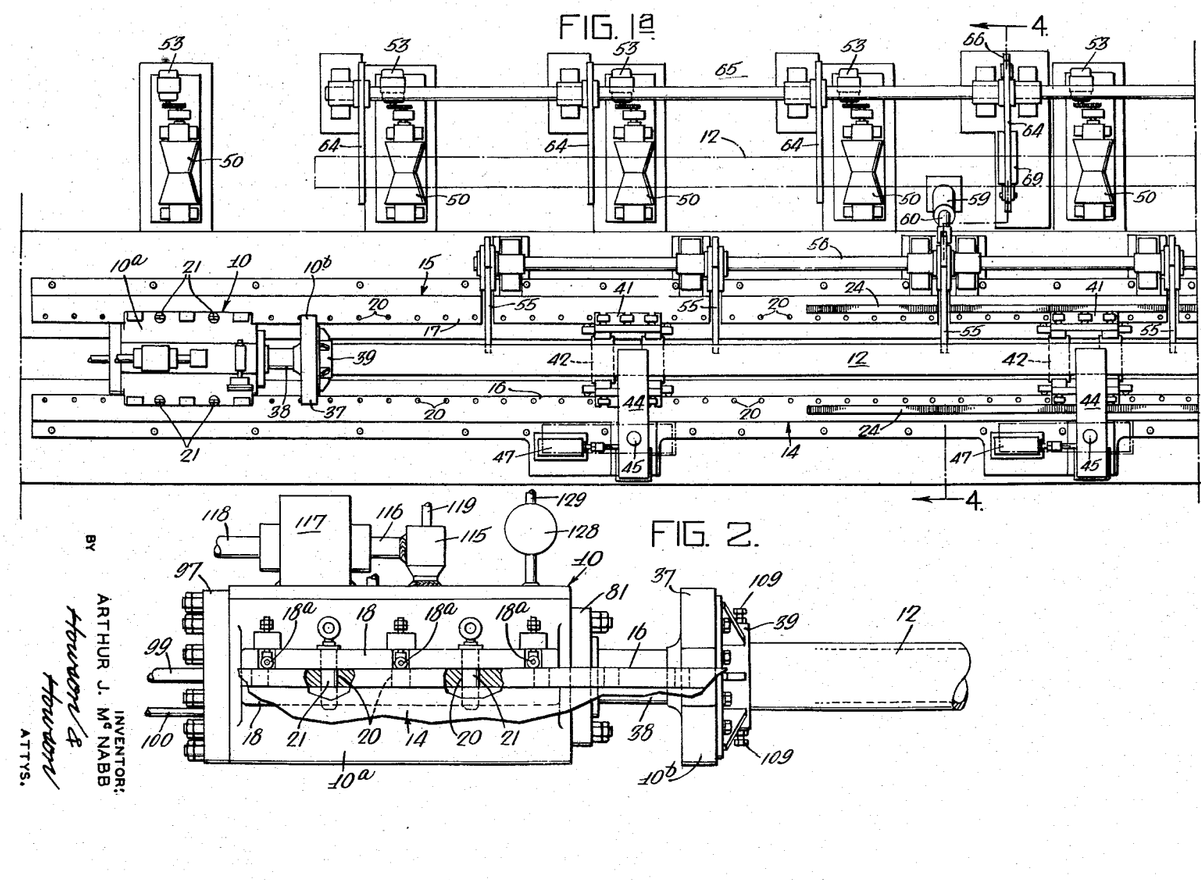
Figures 1B, 3:
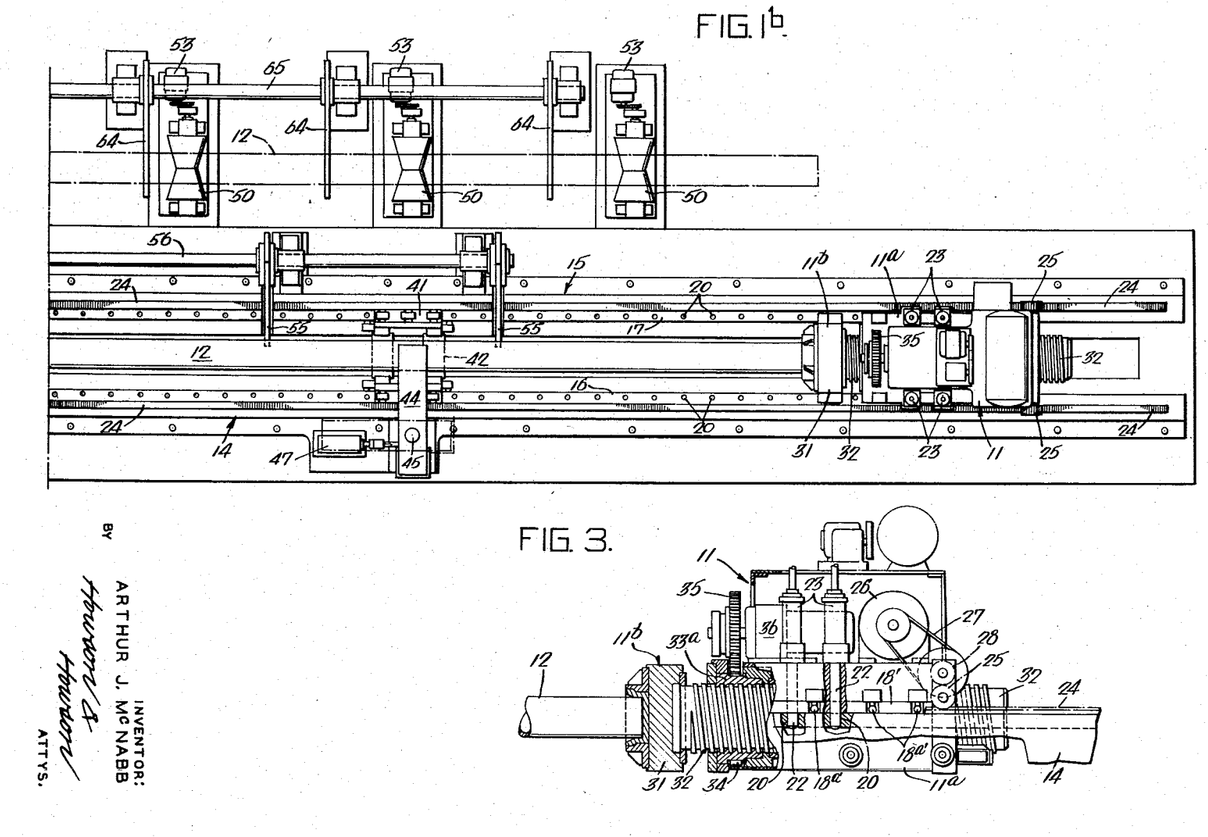
Fig. 1b is a plan view similar to Fig. 1a of the other end of the machine.
Fig. 3 is a side elevational view partially in section showing a view of the head at the end of the machine shown in Fig. 1b.

The head 11 shown in Fig. 3 is sometimes referred to as the mechanical head. It consists of a movable socket support 31 having a shaft 32 which is engaged by the support structure 11a to permit axial movement of the sealing structure 11b relative to the support structure. Mounted on the socket support 31 is a pipe-receiving socket structure which hereafter will be described in greater detail.

As will be observed, the shaft 32 is arranged so that it extends axially in the direction of movement of the sealing structure and toward the other head. The shaft is threaded and is supported within the support structure 11a partially in a nut-like structure 33a having internal threads which mate with the threads on the shaft 32. The nut-like structure 33 is rotatable and is driven by a coaxial gear 34 on its periphery which mates with a driving gear 35 driven by a motor 36.

The head structure shown in Fig. 2 is sometimes known as the hydraulic head and is provided with a sealing structure with a socket support 37 having a shaft 38 which is axially aligned in the direction of movement with the head structure and which points directly toward the head 11. Supported on the head 37 is a pipe-receiving socket 39 which accepts the end of pipe 12 in a fluid-tight seal as will hereafter be described.

Referring now specifically to Fig. 4, as well as to Figs. 1a and 1b, it will be seen that intermediate the heads are a plurality of cradle supports 41 having track-engaging flanges which engage tracks 16 and 17. Each cradle support accepts an insert 42 which is selected on the basis of the diameter of pipe to be tested. Insert 42 may be replaced by inserts of other sizes when pipe of other sizes is being tested. Supports 41 are spaced at intervals along the track between the heads so that the pipe will not sag under its own weight particularly when filled with water or other fluid-testing substance. The pipe is held against the insert 42 by an overlying pad 43 on an arm 44 which is movably supported on a piston shaft 45. The piston 45 is engageable within cylinder 46 and is movable vertically (i.e. axially) as well as rotatably so that the arm 44 and pad 43 may be raised from the pipe and swung away from above the pipe. The cylinder 46 is rotated by means of hydraulic cylinder 47 which may be controlled in a conventional manner. Arranged in a row parallel to the direction of extension of pipe 12 are a plurality of rollers 50 all provided with parallel axes supported in bearings 51 on support structures 52 fixed in turn to the foundations. These rollers, or some of them, are driven by motor 53 through a suitable gear coupling system. The rollers are roughly hourglass shaped to provide a concavity which will tend to center and direct pipe of any size. Extending between the line of cradles 41 on the machine base and the line of rolls 50 are a plurality of double ended hooked arm devices 55 arranged parallel to one another and having pipe engaging hooks 55a and 55b at its opposite ends. These hooks are all fixed to a common shaft 56 so that movement of one causes movement of all others. The shaft is pivotally supported on a series of brackets 57 which are in turn fixed to the foundation. The hook on one end 55a is arranged to engage the largest diameter pipe to be tested on the side remote from the machine. The hook 55b similarly is arranged to engage on the side remote from the rollers 50 any pipe supported on the machine. An actuating cylinder 59 having a piston 60 is attached at one end to the arm 55 by a pin 61 parallel to the shaft 56 and at its other end by a parallel pin 62 to a bracket fixed to the foundation. This actuating cylinder permits the rocking of the hook-like arms 55 in two directions in order to pick up pipe on the machine and roll it over to the rollers or pick up pipe on the rollers and roll it over the machine. A somewhat similar arm 64 is provided with a hook 64a at one end which extends beyond the rollers sufficiently far on the side of the machine to pick up pipe of any size from the roller. This arm is pivoted on a shaft 65 to which parallel arms similar to arm 64 are fixed at intervals over the whole length of the machine. An arm 66 provides a crank action to actuate arm 64. This arm 66 is fixed to piston 67 by a pin 68 parallel to shaft 65. Piston 67 is actuated by a cylinder 69 in which it is engaged and the cylinder 69 is, in turn, fixed by pin 70 to a bracket 71 on the foundation.

In operation of the device illustrated in Figs. 1–4, the machine is first set up to accept pipe of the length and diameter to be tested. Since readjustment of the machine is necessary if sizes vary, sorting of the pipe is the first step.

The position of the mechanical head 11 is then adjusted relative to the hydraulic head 10 to accept pipe of the length selected. Movement as previously described is accomplished by removal of pins 22 and energization of the motor 26 to actuate driving pinions 25. Occasionally, it may be necessary to adjust the position of head 10, but this is rarely done. When head structures 10 and 11 are spaced with their sealing portions 10b and 11b sufficiently far apart to allow accommodation of a length of pipe to be tested and the pins 22 are reinserted in other holes 20, it is then possible to make final adjustment of the sealing means to accommodate a length of pipe for testing. However, before pipe is tested, the support sockets of the sealing means may have to be changed or adjusted, as will hereafter be described, to accommodate pipe of the diameters which is to be tested and, if the change of sockets has not been accomplished before, it can be done at this time. The rollers 50 are then driven in a clockwise direction to cause pipe to move axially (from left to right in Fig. 1a) along the rollers to a position opposite the machine between the sealing means 10b and 11b and the drive of the rollers is thereupon stopped. This can also be accomplished by driving only rollers remote from those opposite the first head which the pipe passes, and not those between the heads. Once in this position, the arm 55, which is in a position so that it lies below the pipe on rollers 50, is gradually raised into the position shown in Fig. 4. As it is raised, hook 55a engages the pipe and as the arm 55 becomes inclined, the pipe rolls across the arm to the cradle 41 and into insert 42. Then the arm continues to be lowered into the position shown in Fig. 4 so that it will not interfere with the pipe being tested. Thereafter, the arm 44 may be raised and rotated over the pipe and the pad 43 placed in position against the pipe opposite the insert 42. The sealing means of the heads 10 and 11 are brought into engagement with the ends of the pipe and testing proceeds as will hereafter be described.

After the pipe has been tested, the pad 43 is removed and the arm 44 rotated away from the pipe as the sealing means are removed from the ends of the pipe. The arm 55 is then raised to the position where hook 55b engages the pipe. Thereafter, the arm 55 is tilted the opposite direction so that the pipe rolls downward back onto the rollers 50. Thereafter, cylinder 69 is actuated causing the piston 67 to be withdrawn and arms 64 to raise the pipe following engagement with its hook 64a so that it is moved off the rolls, perhaps onto another set of rolls for carrying the pipe in the opposite direction.

Figures 5, 6, 7:
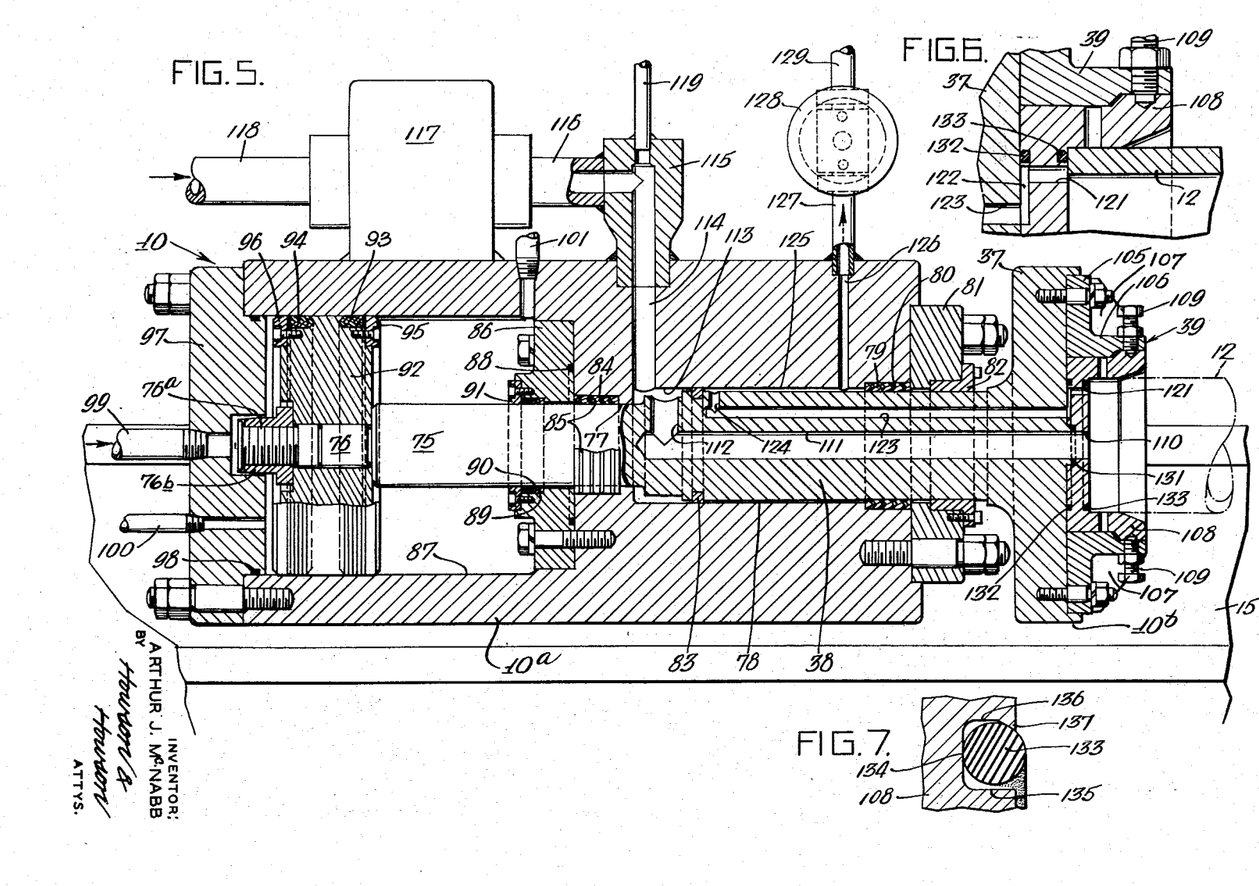
Fig. 5 is a vertical sectional elevational view of the sealing means of the head of Fig. 2 showing the fluid access and air evacuation conduits.
Fig. 6 is a detailed view of a portion of the sealing structure of the head of Fig. 5.
Fig. 7 shows the sealing ring of Fig. 6 which bears against the end of the pipe in its slot.

Referring now to Fig. 5, the hydraulic head 10 is illustrated with details of the head shown in Figs. 6 and 7. It will be observed in Fig. 5 that the sealing receptacle supporting shaft 38 serves a number of functions including transmitting the action of the piston 92 and supplying testing fluid to the receptacle. Shaft 38 has a smaller diameter portion 75 remote from the sealing receptacle, and that portion, in turn, is terminated in a smaller diameter shank portion 76 which has a threaded end 76a. The head support part 10b may be formed from a solid block cylindrically counterbored to receive the various diameters of the piston. The minimum diameter of the hole through the block occurs at surface 77. Toward the actual sealing structure from the surface 77 is a larger diameter opening 78 which loosely accommodates the larger diameter portion 38 of the support shaft. The mouth of opening 78 may be counterbored to provide a larger diameter portion 79 and a shoulder against which "Chevron" type packing rings 80 may be accommodated. These packing rings are held in place by ring 81 which may be bolted to the block in a recessed portion of the end thereof. Plate 81, in turn, may accommodate a bearing insert 82 which supports shaft 38.

On the other side of small diameter opening 77 immediately adjacent this support surface is a larger diameter bore 84 which accommodates "Chevron" packing rings 85. These rings are held in place by an annular plate 86 of approximately the diameter of cylinder 87, which is adapted to enclose a large fluid actuated piston. Plate 86 may be bolted in place with an O-ring 88 in a groove therein, which O-ring provides a seal between the planar surface of plate 86 and the end wall formed by a shoulder between portions 84 and 87 of the axial bore through head block 10b. Plate 86 may be recessed in a counterbored portion 89 to accommodate "Chevron" packing rings 90 which are held in place by a small ring 91 which also provides a bearing surface for shaft portions 75 and which may be bolted to the plate 86 as illustrated. On the shank end 76 of the shaft portion 75 is fixed a piston 92. This piston is held against the shoulder between shaft portions 75 and 76 by a nut 76b which engages threaded portion 76a of the shank. The piston itself is recessed at its edges to accommodate "Chevron" packing rings 93, 94. These packing rings are held in place by annular rings 95, 96 which may be bolted to the piston as shown. Closing the end of the cylinder is a heavy plate 97 which is bolted in place and which is provided with a fluid tight O-ring packing 98.

A fluid inlet and outlet is provided through end plate 97 and supply line 99, to supply and exhaust the cylinder on one side of the piston, which dual operation may be accomplished by a three-way valve (not shown). A common fluid inlet and outlet is also provided to the other side of the piston 92 and may be connected to a three-way control valve through line 101. Line 100 permits the constant replenishment of fluid to maintain pressure constant.

The sealing receptacles at both ends of the machine may be similar in form in many respects so that a description of the receptacle at one end is sufficient. The sealing socket or receptacle is supported on a recessed base plate. The receptacle is preferably cup-like in form, although it need not be made from a single piece. Its sidewalls provide support means adapted to circumferentially engage and mechanically support the outer sidewalls at one end of the pipe. Its bottom provides a closure for the end of the pipe and is preferably planar on its outer bottom surface to match its support. This sealing closure is mounted relative to the support member 37 by means of a ring bracket 105 having a tubular flange 106 with webs 107 extending between the essentially planar and the tubular portions for added strength. The sealing receptacle fits within the tubular flange and is a removable cup 108 having a tapered lip which receives the end of the pipe 12. The cup is easily removed by loosening the set screws 109. Extending axially through the bottom of the cup is a hole 110. This hole is aligned with an axial duct 111 extending through the portion 38 of the shaft. This duct terminates approximately at the point where the diameter of the shaft is reduced to form portion 75 and at this point a laterally extending duct 112 extends radially upwardly to an annular chamber 113 around the shaft in that region. Into this annular chamber through the block 10a extends a duct 114, which duct divides within a fitting 115 into two branches. One of these branches is continued by a relatively large diameter pipe 116 which leads into a check valve 117 which is supplied fluid through line 118. The other branch of the fitting 115 is preferably smaller and extends into a high pressure pipe line 119.

Also through the bottom of the sealing receptacle extends a duct 121 which is arranged to lie at the highest point within the pipe being tested. The back of the cup surface is recessed to form a duct 122 which extends downwardly from duct 121 to duct 123 which extends through the shaft portion 38. This duct 123 is terminated in a laterally extending duct 124 which leads into a recessed portion 125 between the shaft and the sidewalls of the bore through housing 10b. In communication with this region is a duct 126 through block 10b which is terminated in a pipe 127 which passes through a special control valve 128 to a discharge pipe 129. Lying partially within coaxially arranged concentric annular grooves in the bottom of cup 108 and facing the support face plate 37 are O-rings 131 and 132. In the opposite face at the periphery of the pipe is a groove containing the major portion of an O-ring 133 which may best be seen in Figs. 6 and 7. This annular groove has inner and outer generally concentric sidewalls 135 and 136 essentially perpendicular to the bottom of the groove providing generally U-shaped cross section. Near its top edge, outer sidewall 136 is provided with a ridge portion 137 which extends inwardly beyond the outer edge of the O-ring and hence tends to hold it into position in its groove.

In the operation of the hydraulic head shown in Fig. 5, the sealing means is advanced to the right in order to engage one end of the pipe to be tested within the sealing receptacle. This advance is accomplished by introducing fluid through pipe 99 into the space between the piston 92 and wall 97 to urge the piston forward. Fluid on the other side of the piston is withdrawn through pipe 101. The fluid may be introduced under high pressure so that the packing rings 94 and 93 are necessary to prevent flow of fluid from one side of the piston to the other and the packing rings 98, 88, 89, and 85 prevent escape of fluid from the cylinder. It will be observed that the reverse process is useful to remove the pipe from the sealing receptacle.

When the sealing receptacles engage the opposite ends of the pipe, the movement of piston 92 which slowly advances, produces a compression of the O-ring 133 between the end of the pipe and the bottom 134 of the groove in the end closure portion of cup 108 until a good seal is made between the end of the pipe and the sealing receptacle by the deformation of the O-ring. As previously mentioned, a sealing receptacle similar to cup 108 is also provided in the head 11 so that a good liquid tight seal is provided at each end of the pipe. Thereafter, water or other testing fluid is introduced through supply pipe 118, check valve 117, pipe 116, fitting 115 and conduit 114 into chamber 113 and thence into passages 112 and 111, through opening 110 and into the pipe. As the pipe fills, air is forced to flow out the opening 121 through passages 122, 123, 124 into chamber 125 and thence out passage 126 and pipe 127 through valve 128 and exhaust pipe 129. The reason for placing the duct 121 at the highest point is to facilitate the escape of air forced out of the pipe and air will flow out until the pipe is full of water at which time water will be forced through the conduit provided for the escape of air. The valve 128 may be of a type whereby, when water reaches it, it will automatically shut off. At this stage or somewhat earlier the rapid filling of the pipe using flow through line 116 is discontinued and water pressure is increased by fluid under pressure introduced through pipe 119. It will be appreciated that since the pressures on both sides of barrier ring 83, which separates the inflow and outflow regions, are equal no packing is required there. However, "Chevron" rings 80 and 85 are required to prevent escape of fluid under pressure from the region around shaft 38. Likewise, O-ring 132 prevents the escape of fluid from its intended course, whereas O-ring 131 is a nominal barrier between the inflow and outflow regions.

As the pipe is being filled with fluid and as internal pressure increases, it will tend to expand radially and shorten axially. In order to avoid breaking the seal at ring 133 and the corresponding seal with the head at the opposite end of the pipe, fluid pressure on the piston 92 is kept high. This is accomplished by providing a constant fluid pressure supply through pipe 100. As the pipe diameter increases and the axial length of the pipe shortens, the pressure of the pipe on the sealing means could be released. However, under the urging of the constant pressure supplied by pipe 100, the piston will move forward and maintain the force of the sealing means against the pipe; thus the seal is kept fluid tight. The moving of the sealing means will permit testing to proceed to much higher fluid pressures than has heretofore been possible. Following testing, fluid pressure may be reduced by opening valve 128. Reversing movements of piston 92 (Fig. 5) and shaft 32 (Fig. 3) withdraws both sealing means allowing testing fluid to flow from tested pipe to receiving trench.

Although the sealing receptacle of the type shown in Figs. 5 and 6 works well, it requires considerable work to replace since it is necessary to remove the supporting bracket as well as the receptacle from the support 37. The modified structure of Figs. 8–12, while it involves more parts, is actually easier and less time consuming to use because it involves only the simple replacement of the sealing receptacle without replacement of the support for the receptacle.

Figure 8:
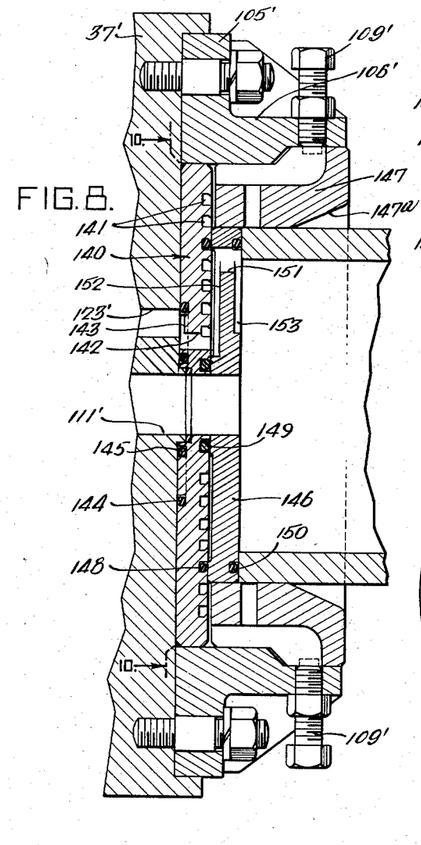
Fig. 8 is sectional view of part of a modified type of head.
Figures 9, 11, 12:
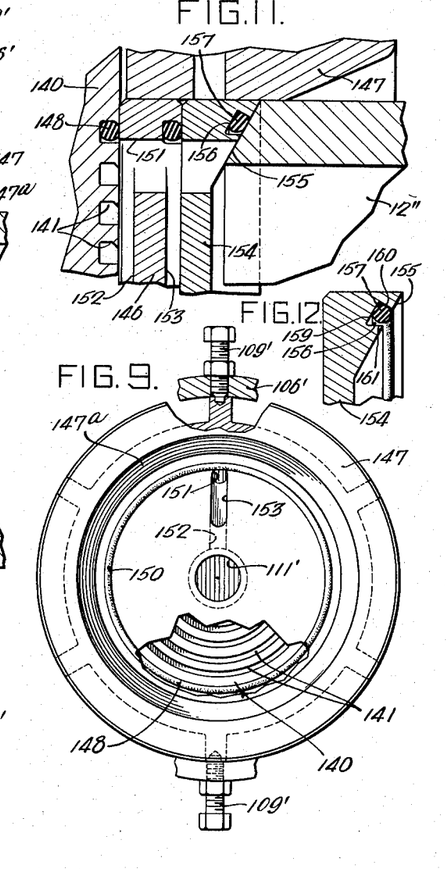
Fig. 9 is a plan view from the front of the structure of Fig. 8.
Fig. 11 is a detailed view of a portion of the structure of Fig. 9.
Figure 10:
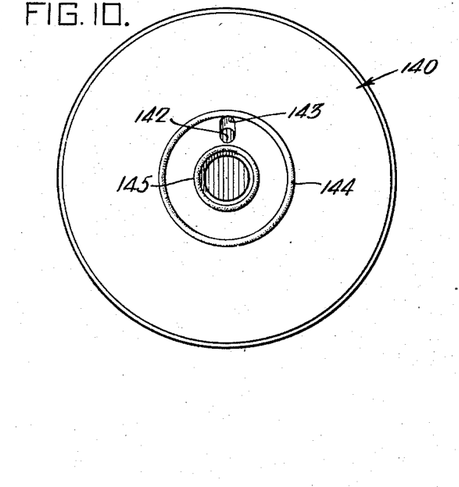
Fig. 10 is a view taken along line 10—10 of Fig. 8.

In the structure of Figs. 8–10, some of the structure is essentially like that previously described and to the extent that they are similar, parts are designated by the same numbers with the addition of primes thereto. For example on the support 37' is an annular supporting flange 105'—106', the sealing receptacle being supported in place by set screws 109'. Not involved in the previously described structure, however, is a circular plate 140 which has a plurality of concentric annular grooves of generally U-shaped cross section in one face. These grooves 141 are preferably all of the same general type as the groove illustrated in Fig. 7 and O-rings are available for each of the grooves. A central axial opening aligned with duct 111' permits the inflow of water. Access to the outflow duct 123' is provided by opening 142 which is closer to the center of plate 140 than duct 123', but to the extent that there is no overlap, opening 142 and duct 123' are joined by channel 143 in the back of plate 140 remote from the side bearing the concentric grooves. O-ring 144 protruding from an annular U-shaped groove in the back of plate 140 makes a fluid tight seal between the plate and the support base 37' O-ring 145 protruding from an annular groove provides a barrier between the inflow of water and the outflow of air. The plate 140 stays in place in the annular bracket and hence may be fixed to the bracket 105'—106', by welding or otherwise, or may be left separate.

In this case, the actual receptacle for the end of the pipe is again a cup, the bottom 146 and sidewalls 147 of which may be separately fabricated. The bottom 146 provides an end closure for the pipe 12' and the sidewalls provide support for the end of the pipe, the circumferential surface of which it engages. It also serves as a guide to the sealing means 149 and, since it snugly accommodates the end of the pipe, its mouth 147a is flared to facilitate insertion of the end of the pipe. Sidewalls 147 are provided with radial flanges which extend to the inside surface of tubular portion 106' of support flange 105'—106' and set screws 109' are positioned to engage these flanges and hold them in position. The bottom 146 may be fixed to the sidewalls or left as a separate piece. In either event, an area on the outside of the bottom is provided to engage O-ring 148 and another area is provided to engage O-ring 149, both of which O-rings lie in the concentric grooves 141. The O-ring 149 is a barrier between the inflow of water and the outflow of air, whereas O-ring 148 prevents the escape of fluid under pressure. At the highest point, a hole 151 extends through the end closure bottom to assure complete removal of air. A radially directed channel 152 in the outside of the bottom 146 interconnects hole 151 and hole 142 in plate 140. Ring 148 in the nearest groove 141 above the channel 151 is the effective seal, and other O-rings except ring 149 in other channels 141 may be left in place or removed without harm. The exhaust of the pipe being tested is better accomplished by providing a recess or groove 153 which extends well below the air exhaust opening 151. It will be observed that as the size of the end closure is changed, the effective O-ring corresponding to O-ring 148 will vary and, of course, the length of channel 152 will vary from closure to closure.

In some instances, the ends of pipe are not square. Typical cases in which pipe is intentionally provided with non-square edges are those in which lengths of pipe are to be welded together. In such cases, beveled ends are frequently employed. In such event, an end closure, mating with the end of the pipe is provided and this can be done by using a different end closure or providing an adapter. The typical case of the adapter is illustrated in Figs. 11 and 12 wherein the adapter is shown used with the structure of Figs. 8–10. In this case, the adapter is an insert 154 which has a beveled edge 155 intended to mate with the beveled end of pipe 12'. In this beveled edge 155 is a generally U-shaped annular channel 156 which contains an O-ring 157. As seen in Fig. 12, channel 156 has a bottom 159 generally parallel to the surface 155 and an outer sidewall 160 generally perpendicular to the bottom and the surface 155. Its inner sidewall 161, however, has its elements directed generally parallel to the axis. The O-ring is selected to have such dimensions that it extends against the walls 159 and 160 and the edge of the wall 160 extends inwardly beyond the outer edge of O-ring 157 thereby holding it in place.

In all cases where O-rings have been used and where they are initially compressed between opposed surfaces as fluid pressure increases the O-ring will be further deformed and improve the O-ring seal.

One construction of the present invention has been shown and described and modified sealing means has been described. Other constructions and additional modifications will occur to those skilled in the art, and all such versions within the scope of the claims are intended to be within the scope and spirit of the present invention.

I claim:

1. A machine for testing hollow tubular pipe comprising a base, a pair of laterally spaced heads, sealing means on each of the heads axially aligned with one another and adapted to engage the opposite ends of a length of pipe to be tested and to seal the ends of the pipe by axial pressure of the respective sealing means on the opposite ends of the pipe, fluid supply means for introducing fluid into the interior of a length of pipe on the machine and for supplying sufficient pressure on the fluid to produce a satisfactory test of pipe wall strength, and follow-up means, including piston surfaces directly connected to the head and in line therewith within cylinder means, and supply duct means to the cylinder means in position to supply fluid to the cylinder means to act upon the piston means to oppose and exceed the force effect of testing fluid with a pipe being tested upon the head, urging the sealing means of one of the heads against the end of a pipe on the machine so that it follows any axial shortening of the pipe and preserves a fluid tight seal.

2. The structure of claim 1 in which the cylinder means includes a cylinder having alternate inlet ducts for supplying large volumes of fluid under low pressure or small volumes of fluid under high pressure which cylinder has a piston which is at least part of the piston means connected to the head for advancing the head whereby large volumes of fluid at low pressure or smaller volumes of fluid at larger pressure may be used to oppose the force of the testing fluid.

3. The structure of claim 1 in which there is provided packing between the cylinder and piston means providing a fluid tight closure and defining the region within the cylinder, duct means adapted to supply testing fluid from a supply to a pipe under test in the machine through the head incorporating the follow-up means, said duct means extending through the cylinder means into the region within the cylinder and thence through the piston to the region within the sealing means on that head, such that fluid pressure against part of the area of the piston within the cylinder provides a force in opposition to the fluid pressure force within the pipe against the piston tending to drive the piston away from the end of the pipe.

4. The structure of claim 3 in which there is provided a venting duct means from the region within a pipe under test to the outside of the head, said venting duct means paralleling the testing fluid supply duct means and further packing dividing the region within the cylinder into two compartments constituting part of the respective duct means such that through one of said compartments fluid is adapted to enter the pipe and through the other of said compartments fluid is adapted to leave the pipe, and check valve means associated with said vent duct assuring that flow is always in the direction from inside the pipe to outside the head.

5. In a pipe testing machine, a pair of opposed sealing receptacles for holding the ends of a length of pipe in fluid tight seals, each of said receptacles comprising support means adapted to circumferentially engage and mechanically support the outer sidewalls at the end of the pipe, a closure for each end of the pipe and an O-ring adapted to engage in a circular seal the end surface of a pipe, said O-ring being supported in an annular groove on said closure such that it protrudes beyond the groove, the protruding portion of said O-ring being arranged to be partially compressed by the end of a length of pipe which is supported by and compressed axially against the ring by the opposed sealing means.

6. The sealing receptacle of claim 5 in which the annular groove has inner and outer sidewalls and a bottom all of which provide a generally U-shaped cross section of such dimensions that the O-ring tends to lie against the outer wall, said outer wall being arranged adjacent its top edge to extend inwardly beyond the outer edge of the O-ring in order to hold the O-ring within the groove.

7. The sealing receptacle of claim 6 in which the annular groove has concentric sidewalls and the portion of the outer wall extending inwardly beyond the O-ring is a narrow ridge.

8. The sealing receptacle of claim 6 for beveled end pipe in which the end closure is provided with a frustoconical surface to mate with the beveled end of the pipe, the groove being provided in the beveled portion of the end closure such that its outer sidewall is perpendicular to the beveled surface and its inner sidewall is generally cylindrical.

9. The sealing receptacle of claim 6 in which the structure for receiving the end of the pipe is fixed to part of the movable portion of a head of the machine and in which the receptacle is cup-like and is secured to a support face of the movable head portion.

10. The sealing receptacle of claim 9 in which the receptacle is secured by an annular bracket which has a radially extending portion which fits against a planar mounting surface and an annular portion which engages portions of the receptacle.

11. The sealing receptacle of claim 9 in which the cup-like structure is supported relative to a planar supporting surface by an annular flange having a radial portion abutting the planar surface and a cylindrical portion which supports the cup, said structure being adapted to support cup sidewalls of various diameters, said cup sidewalls being provided with radially extending flanges extending from the sidewalls to the cup supporting flanges.

12. The sealing receptacle of claim 5 for at least one of the sealing means of a pipe testing machine in which said sealing means is provided at some place within the O-ring with an opening permitting the entry of liquid for filling the pipe and in which the end closure is provided adjacent the O-ring at the top of the structure with an opening for exhausting air trapped within the pipe as the pipe is filled with testing liquid.

13. The structure of claim 12 in which the receiving portion for the end of the pipe is a cup-like structure supported against a planar surface through which extend channels to supply liquid and to exhaust air, sealing means between the end closure and the generally planar support surface preventing leakage from the liquid supply channel to the air exhaust channel, and sealing means between the end closure and the support surface at a radius greater than the air exhaust channel in order to prevent escape of fluid from the exhaust pipe.

14. The structure of claim 13 in which the air exhaust channel is located at the highest point within the sealing means on the end closure.

15. The structure of claim 12 in which an intermediate plate is employed to facilitate sealing at a variety of levels, said sealing plate being a generally heavy disk-like member provided on one side with a pair of annular grooves of generally U-shaped cross section for supporting sealing O-rings to separate an axial liquid supply channel and a close spaced air exhaust channel in the plate, thereby to prevent the escape of fluids from their designated channels and in the other face of which are a plurality of concentric annular channels of generally U-shaped cross section, and O-rings in the inner groove to separate liquid inflow and fluid outflow channels and in an outer groove selected to mate with the outer edge of an end closure selected, a variety being available corresponding to standard pipe sizes, said end closures being provided with O-rings to seal the end closure to the pipe and surfaces to seal to the O-rings in the plate and with an aligned liquid intake channel and a fluid exhaust channel at the highest point in the end closure and a connecting channel to fluid exhaust channel in the plate, and the sealing receptacle having cup sidewalls for supporting the pipe, said sidewalls having radial flanges which extend into contact with the tubular portion of the annular flange.

References Cited in the file of this patent

UNITED STATES PATENTS

| | | |
|---|---|---|
| 2,493,061 | Devine et al | Jan. 3, 1950 |
| 2,497,193 | Webb | Feb. 14, 1950 |
| 2,507,124 | Stillinger | May 9, 1950 |
| 2,565,460 | Woodlief | Aug. 21, 1951 |
| 2,707,876 | McConnell et al. | May 10, 1955 |
| 2,725,743 | Reichl | Dec. 6, 1955 |